(12) United States Patent
Nishino et al.

(10) Patent No.: US 11,498,645 B2
(45) Date of Patent: Nov. 15, 2022

(54) SHIFTING CONTROL DEVICE AND ELECTRIC SHIFTING SYSTEM

(71) Applicant: SHIMANO Inc., Sakai (JP)

(72) Inventors: Takafumi Nishino, Sakai (JP);
Toshihiko Takahashi, Sakai (JP);
Daisuke Nago, Sakai (JP); Satoshi Shahana, Sakai (JP)

(73) Assignee: Shimano Inc., Sakai (JP)

( * ) Notice: Subject to any disclaimer, the term of this patent is extended or adjusted under 35 U.S.C. 154(b) by 993 days.

(21) Appl. No.: 16/190,031

(22) Filed: Nov. 13, 2018

(65) Prior Publication Data

US 2019/0161140 A1  May 30, 2019

(30) Foreign Application Priority Data

Nov. 30, 2017 (JP) .............................. JP2017-230335

(51) Int. Cl.
| | | |
|---|---|---|
| *B62M 25/08* | (2006.01) |
| *B62M 9/122* | (2010.01) |
| *B62L 3/02* | (2006.01) |
| *B62M 9/132* | (2010.01) |
| *B62K 23/06* | (2006.01) |
| *B62M 25/04* | (2006.01) |
| *B62M 25/00* | (2006.01) |
| *B62M 9/123* | (2010.01) |
| *B62M 9/133* | (2010.01) |

(52) U.S. Cl.
CPC .............. *B62M 25/08* (2013.01); *B62L 3/02* (2013.01); *B62M 9/122* (2013.01); *B62M 9/123* (2013.01); *B62M 9/132* (2013.01); *B62M 9/133* (2013.01); *B62K 23/06* (2013.01); *B62M 25/04* (2013.01); *B62M 2025/006* (2013.01)

(58) Field of Classification Search
CPC ........ B62M 9/10; B62M 9/122; B62M 9/123; B62M 9/132; B62M 9/133; B62M 25/02; B62M 25/04; B62M 25/08; B62M 2025/006; B62L 3/02; B62K 23/06
See application file for complete search history.

(56) References Cited

U.S. PATENT DOCUMENTS

| | | | | |
|---|---|---|---|---|
| 5,279,179 A | * | 1/1994 | Yoshigai | .................. B62L 3/02 74/489 |
| 5,528,954 A | * | 6/1996 | Yoshigai | ................ B62K 23/06 74/489 |
| 5,676,021 A | * | 10/1997 | Campagnolo | .......... B62K 23/06 116/28.1 |

(Continued)

FOREIGN PATENT DOCUMENTS

| | | |
|---|---|---|
| CN | 101239647 A | 8/2008 |
| CN | 102897280 A | 1/2013 |

(Continued)

*Primary Examiner* — Jacob D Knutson
*Assistant Examiner* — Maurice L Williams
(74) *Attorney, Agent, or Firm* — Alleman Hall Creasman & Tuttle LLP

(57) ABSTRACT

To provide a shifting control device and an electric shifting system allowing a user to comfortably ride a human-powered vehicle, a shifting control device comprising a controller configured to control a shifting device in accordance with a first operation performed on an operating device for braking a rotary body of a human-powered vehicle.

17 Claims, 3 Drawing Sheets

(56) References Cited

U.S. PATENT DOCUMENTS

| | | | | |
|---|---|---|---|---|
| 5,802,923 A * | 9/1998 | Hara | ............... | B62K 23/04 |
| | | | | 74/473.13 |
| 5,946,978 A * | 9/1999 | Yamashita | ............ | B62M 25/04 |
| | | | | 74/502.2 |
| 6,098,488 A * | 8/2000 | Vos | ............... | B62L 3/02 |
| | | | | 74/489 |
| 6,691,591 B2 * | 2/2004 | Tsumiyama | ............ | B62L 3/023 |
| | | | | 74/502.2 |
| 6,774,771 B2 * | 8/2004 | Takeda | ............ | B62M 25/08 |
| | | | | 280/260 |
| 7,007,785 B2 * | 3/2006 | Uno | ............... | B62K 23/06 |
| | | | | 192/217 |
| 7,563,998 B2 * | 7/2009 | Ueno | ............... | B62K 23/06 |
| | | | | 200/466 |
| 7,614,971 B2 * | 11/2009 | Fujii | ............... | B62M 25/045 |
| | | | | 474/70 |
| 7,779,724 B2 * | 8/2010 | Fujii | ............... | B62M 25/08 |
| | | | | 74/551.8 |
| 8,645,032 B2 * | 2/2014 | Pasqua | ............ | B62M 25/08 |
| | | | | 701/51 |
| 8,744,699 B2 * | 6/2014 | Yamaguchi | ............ | B62K 23/02 |
| | | | | 701/51 |
| 9,073,595 B2 * | 7/2015 | Miki | ............... | B62K 23/02 |
| 9,321,501 B1 * | 4/2016 | Miki | ............... | B62M 25/04 |
| 9,731,787 B2 * | 8/2017 | Hirotomi | ............ | B62K 23/06 |
| 10,189,531 B2 * | 1/2019 | Fujiwara | ............ | B62M 25/04 |
| 10,189,538 B2 * | 1/2019 | Nishino | ............ | B62K 23/06 |
| 10,427,755 B1 * | 10/2019 | Taves | ............... | B62M 25/02 |
| 10,513,307 B2 * | 12/2019 | Komatsu | ............ | B62L 3/023 |
| 10,933,949 B2 * | 3/2021 | Nishino | ............ | B62K 25/08 |
| 2004/0237697 A1 * | 12/2004 | Kawakami | ............ | B62M 25/04 |
| | | | | 74/501.6 |
| 2004/0237698 A1 * | 12/2004 | Hilsky | ............ | B62M 25/04 |
| | | | | 74/502.2 |
| 2005/0223840 A1 * | 10/2005 | Takamoto | ............ | B62K 25/08 |
| | | | | 74/502.2 |
| 2006/0058134 A1 * | 3/2006 | Mercat | ............ | B62M 25/045 |
| | | | | 474/80 |
| 2006/0207375 A1 * | 9/2006 | Jordan | ............ | B62M 25/04 |
| | | | | 74/489 |
| 2008/0196537 A1 * | 8/2008 | Dal Pra' | ............ | B62M 25/04 |
| | | | | 74/502.2 |
| 2009/0031846 A1 * | 2/2009 | Dal Pra' | ............ | B62L 3/02 |
| | | | | 74/502.2 |
| 2015/0033896 A1 | 2/2015 | Jordan | | |
| 2015/0203169 A1 * | 7/2015 | Nishino | ............ | B62M 25/04 |
| | | | | 74/491 |
| 2021/0061394 A1 * | 3/2021 | Takeda | ............ | B62J 45/10 |
| 2021/0086866 A1 * | 3/2021 | Chen | ............ | B62L 3/06 |
| 2021/0147026 A1 * | 5/2021 | Cooke | ............ | A42B 3/0453 |

FOREIGN PATENT DOCUMENTS

| | | |
|---|---|---|
| JP | 2006351267 A | 12/2006 |
| WO | 2016039197 A1 | 3/2016 |

* cited by examiner

SHIFTING CONTROL DEVICE AND ELECTRIC SHIFTING SYSTEM

BACKGROUND ART

The present disclosure relates to a shifting control device and an electric shifting system.

As a shifting control device controlling a shifting device mounted on a human-powered vehicle, patent document 1 describes an example of a known shifting control device. The shifting control device controls the shifting device in accordance with operation of a shift operating device.

Patent Document 1: Japanese Laid-Open Patent Publication No. 2006-351267

SUMMARY

It is desirable that a user of a human-powered vehicle be able to comfortably ride the human-powered vehicle.

It is an object of the present disclosure to provide a shifting control device and an electric shifting system allowing a user to comfortably ride a human-powered vehicle.

A shifting control device according to a first aspect of the present disclosure comprises a controller configured to control a shifting device in accordance with a first operation performed on an operating device for braking a rotary body of a human-powered vehicle.

In accordance with the shifting control device according to the first aspect, the rotary body of the human-powered vehicle is braked and the shifting device is controlled in accordance with the first operation performed on the operating device. Thus, after braking, a comfortable riding feel is provided to the user. This allows the user to comfortably ride the human-powered vehicle.

In accordance with a second aspect of the present disclosure, the shifting control device according to the first aspect is configured so that the shifting control device controls the shifting device to change a transmission ratio of the human-powered vehicle in accordance with the first operation.

In accordance with the shifting control device according to the second aspect, after braking, a further comfortable riding feel is provided to the user.

In accordance with a third aspect of the present disclosure, the shifting control device according to the second aspect is configured so that the shifting control device controls the shifting device to decrease the transmission ratio in accordance with the first operation.

In accordance with the shifting control device according to the third aspect, after braking, a further comfortable riding feel is provided.

In accordance with a fourth aspect of the present disclosure, the shifting control device according to any one of the first to third aspects is configured so that the operating device is configured to have a play operating amount before the rotary body starts to be braked in the first operation, and the shifting control device controls the shifting device so that the shifting device is actuated in the play operating amount.

In accordance with the shifting control device according to the fourth aspect, before the rotary body of the human-powered vehicle starts to be braked, the shifting device is controlled in accordance with the first operation performed on the operating device. Thus, the transmission ratio of the human-powered vehicle is smoothly changed.

In accordance with a fifth aspect of the present disclosure, the shifting control device according to any one of the first to fourth aspects is configured so that the shifting control device controls the shifting device so that an actuation aspect of the shifting device differs in accordance with operation information related to an operation state of the operating device.

In accordance with the shifting control device according to the fifth aspect, the shifting device is controlled in accordance with the operation information in which a request of the user is reflected. Thus, after braking, a further comfortable riding feel is provided to the user.

In accordance with a sixth aspect of the present disclosure, the shifting control device according to the fifth aspect is configured so that the operating device includes a lever operated by a user, and the operation information includes at least one of information related to a rotational angle of the lever, information related to a rotation speed of the lever, and information related to operating force applied to the lever.

In accordance with the shifting control device according to the sixth aspect, the shifting device is appropriately controlled in accordance with braking force based on the operation information of the lever. Thus, after braking, a further comfortable riding feel is provided to the user.

In accordance with a seventh aspect of the present disclosure, the shifting control device according to any one of the first to sixth aspects is configured so that the shifting control device controls the shifting device so that an actuation aspect of the shifting device differs in accordance with travel information related to a travel state of the human-powered vehicle other than the first operation.

In accordance with the shifting control device according to the seventh aspect, the actuation aspect of the shifting device controlled in accordance with the first operation performed on the operating device is set in accordance with the travel information. Thus, the shifting device is appropriately controlled in accordance with the travel information.

In accordance with an eighth aspect of the present disclosure, the shifting control device according to the seventh aspect is configured so that the travel information includes first travel information related to speed of the human-powered vehicle.

In accordance with the shifting control device according to the eighth aspect, the shifting device is appropriately controlled in accordance with the first travel information related to speed of the human-powered vehicle.

In accordance with a ninth aspect of the present disclosure, the shifting control device according to the seventh or eighth aspect is configured so that the travel information includes second travel information related to acceleration of the human-powered vehicle.

In accordance with the shifting control device according to the ninth aspect, the shifting device is appropriately controlled in accordance with the second travel information related to acceleration of the human-powered vehicle.

In accordance with a tenth aspect of the present disclosure, the shifting control device according to any one of the seventh to ninth aspects is configured so that the travel information includes third travel information related to an inclination of the human-powered vehicle.

In accordance with the shifting control device according to the tenth aspect, the shifting device is appropriately controlled in accordance with the third travel information related to an inclination of the human-powered vehicle.

In accordance with an eleventh aspect of the present disclosure, the shifting control device according to the tenth aspect is configured so that the third travel information includes information related to an inclination of the human-powered vehicle in a front-rear direction.

In accordance with the shifting control device according to the eleventh aspect, the shifting device is appropriately controlled in accordance with a gradient of a road surface.

In accordance with a twelfth aspect of the present disclosure, the shifting control device according to any one of the seventh to eleventh aspects is configured so that the travel information includes fourth travel information related to force applied to the rotary body by braking.

In accordance with the shifting control device according to the twelfth aspect, the shifting device is appropriately controlled in accordance with the fourth travel information related to, for example, braking force applied to the rotary body.

In accordance with a thirteenth aspect of the present disclosure, the shifting control device according to any one of the seventh to twelfth aspects is configured so that the travel information includes fifth travel information related to operation of a drive mechanism of the human-powered vehicle.

In accordance with the shifting control device according to the thirteenth aspect, the shifting device is appropriately controlled in accordance with the fifth travel information related to operation of the drive mechanism of the human-powered vehicle.

In accordance with a fourteenth aspect of the present disclosure, the shifting control device according to the thirteenth aspect is configured so that the drive mechanism includes a crank, the fifth travel information includes information related to rotation speed of the crank, and the shifting control device controls the shifting device so that a difference between the rotation speed of the crank before the first operation and the rotation speed of the crank after the first operation is included in a predetermined range.

In accordance with the shifting control device according to the fourteenth aspect, the shifting device is appropriately controlled in accordance with the rotation speed of the crank.

In accordance with a fifteenth aspect of the present disclosure, in the shifting control device according to any one of the first to fourteenth aspects, the controller is further configured to control the shifting device in a first control mode in which the shifting device is controlled in accordance with the first operation and a second control mode in which the shifting device is controlled in accordance with a second operation different from the first operation.

In accordance with the shifting control device according to the fifteenth aspect, various control modes can be executed in accordance with a request of the user. This allows the user to comfortably ride the human-powered vehicle.

In accordance with a sixteenth aspect of the present disclosure, in the shifting control device according to the fifteenth aspect, the controller is further configured to control the shifting device in a third control mode in which the shifting device is programmatically controlled in accordance with travel information related to a travel state of the human-powered vehicle.

In accordance with the shifting control device according to the sixteenth aspect, various control modes can be executed in accordance with a request of the user. This allows the user to comfortably ride the human-powered vehicle.

In accordance with a seventeenth aspect of the present disclosure, the shifting control device according to the sixteenth aspect is configured so that the shifting control device controls the shifting device so that an actuation aspect of the shifting device in the first control mode differs from an actuation aspect of the shifting device in the third control mode.

In accordance with the shifting control device according to the seventeenth aspect, the actuation aspect of the shifting device during braking differs from the actuation aspect of the shifting device during automatic shift control. Thus, a further comfortable riding feel is provided to the user.

In accordance with an eighteenth aspect of the present disclosure, the shifting control device according to any one of the first to seventeenth aspects further includes a storage device configured to store information related to control of the shifting device.

In accordance with the shifting control device according to the eighteenth aspect, the shifting device is controlled based on information stored in the storage device.

An electric shifting system according to a nineteenth aspect of the present disclosure includes the shifting control device described above and the shifting device, configured to be electrically driven.

In accordance with the electric shifting system according to the nineteenth aspect, the rotary body of the human-powered vehicle is braked and the shifting device is controlled in accordance with the first operation performed on the operating device. Thus, after braking, a comfortable riding feel is provided to the user. This allows the user to comfortably ride the human-powered vehicle.

The shifting control device and the electric shifting system according to the present disclosure allow the user to comfortably ride the human-powered vehicle.

EMBODIMENTS OF THE DISCLOSURE

Embodiment

Figure 1:
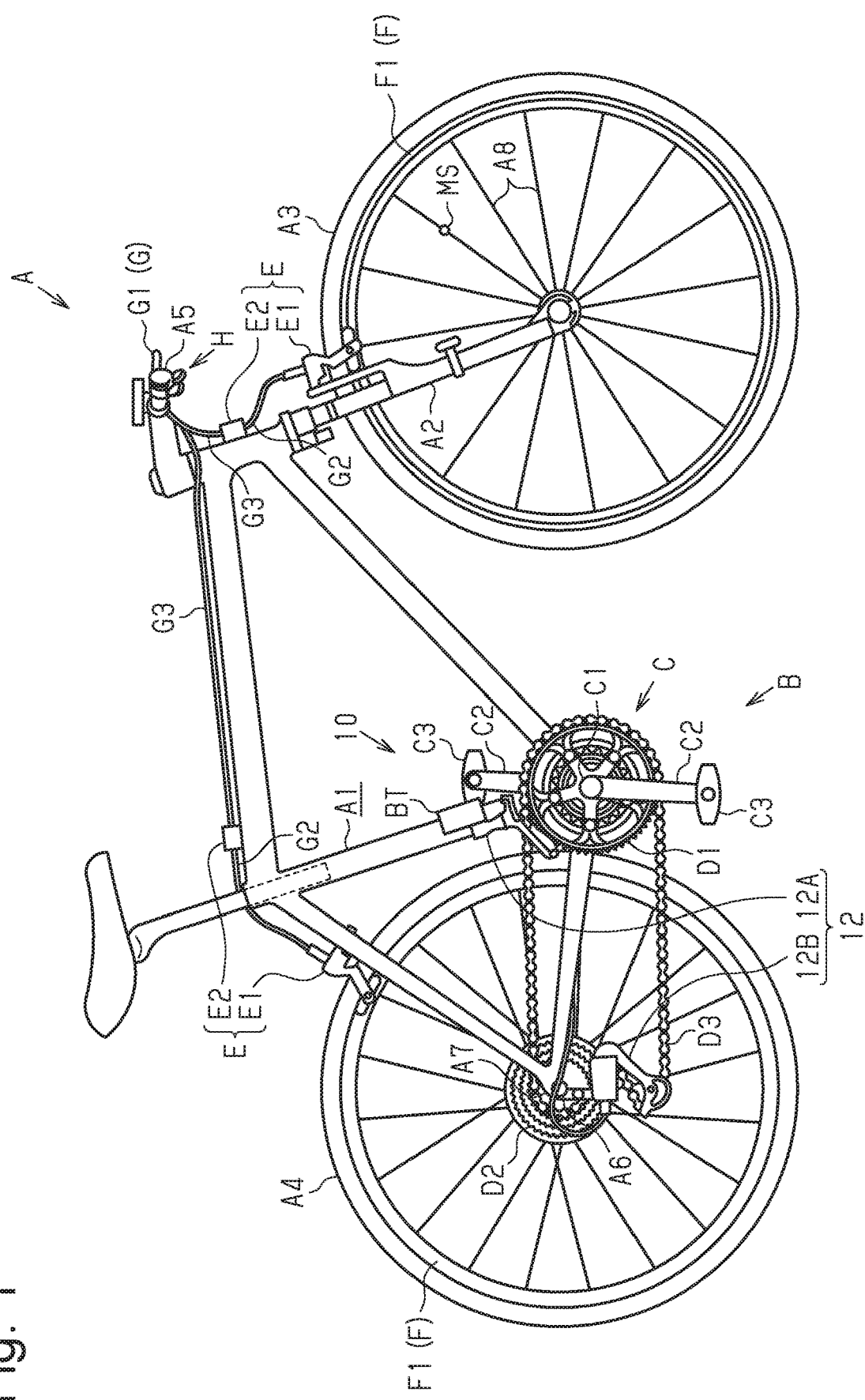
FIG. 1 is a side view of a human-powered vehicle including one embodiment of an electric shifting system.

A human-powered vehicle A including an electric shifting system 10 of the present disclosure will now be described with reference to FIG. 1. A human-powered vehicle stands for a vehicle at least partially using human power as driving power for traveling and includes a vehicle electrically assisting in human power. A vehicle using only driving power other than human power is not included in the human-powered vehicle. In particular, a vehicle using solely an internal combustion engine as driving power is not included in the human-powered vehicle. The human-powered vehicle is generally assumed to be a compact, light vehicle that does not require a license for driving on a public road. The human-powered vehicle A shown in the drawings is a bicycle. Any type of the human-powered vehicle A, as a bicycle, can be selected from, for example, a road bike, a mountain bike, a trekking bike, a cross bike, a city cycle, a cargo bike, and a recumbent bike. A bicycle (e-bike) including an electric assist unit (not shown) assisting in propulsion of the human-powered vehicle A with electric energy can be selected as the type of the human-powered vehicle A. In the present embodiment, the human-powered vehicle A is a trekking bike. The human-powered vehicle A further includes a frame A1, a front fork A2, a front wheel A3, a rear wheel A4, a handlebar A5, and a drive mechanism B.

The drive mechanism B is, for example, a chain-drive type. The drive mechanism B includes a crank C. The crank C includes a crankshaft C1 rotatably supported by the frame A1 and a pair of crank arms C2 respectively provided on two opposite ends of the crankshaft C1. A pedal C3 is rotatably coupled to the distal end of each crank arm C2. The drive mechanism B further includes a front sprocket D1, a rear sprocket D2, and a chain D3. The drive mechanism B can be selected from any type and can be a belt-drive type or a shaft-drive type.

The front sprocket D1 includes one or multiple front sprockets D1 and is arranged on the crank C to rotate integrally with the crankshaft C1. The rear sprocket D2 includes one or multiple rear sprockets D2 and is arranged on a hub A6 of the rear wheel A4. The chain D3 runs around the front sprocket D1 and the rear sprocket D2. Driving force applied by the user riding the human-powered vehicle A to the pedals C3 is transmitted via the front sprocket D1, the chain D3, and the rear sprocket D2 to the rear wheel A4.

The human-powered vehicle A further includes brake devices E, the number of which corresponds to the number of wheels. In the present embodiment, the brake device E corresponding to the front wheel A3 and the brake device E corresponding to the rear wheel A4 are installed on the human-powered vehicle A. The two brake devices E have the same configuration. The brake devices E are mechanically or electrically driven in accordance with operation of operating devices G to brake rotary bodies F of the human-powered vehicle A. In the present embodiment, the brake devices E are each a rim brake device. In the present embodiment, the brake devices E each include an electrically-driven braking portion E1 and an electric driving portion E2 driving the braking portion E1. The electric driving portion E2 is driven, for example, by electric power supplied from a battery BT mounted on the human-powered vehicle A. The electric driving portion E2 can be configured to directly drive the braking portion E1 or can be configured to drive the braking portion E1 via a power transmission medium G2 such as hydraulic oil or a cable. In the present embodiment, the electric driving portion E2 is located at a position separate from the braking portion E1 and configured to drive the braking portion E1 via the power transmission medium G2 (here, a Bowden cable). The rotary bodies F are rims F1 provided on the front wheel A3 and the rear wheel A4 of the human-powered vehicle A. The brake devices E can be disc brake devices. In this case, the rotary bodies F are disc brake rotors (not shown).

The electric shifting system 10 includes an electrically-driven shifting device 12. The shifting device 12 is driven, for example, by electric power supplied from the battery BT. The shifting device 12 includes at least one of a front derailleur 12A and a rear derailleur 12B. The front derailleur 12A is arranged on the frame A1 near the crankshaft C1. As the front derailleur 12A is driven to change the front sprocket D1 on which the chain D3 runs, the transmission ratio of the human-powered vehicle A is changed. The rear derailleur 12B is arranged on a rear end A7 of the frame A1. As the rear derailleur 12B is driven to change the rear sprocket D2 on which the chain D3 runs, the transmission ratio of the human-powered vehicle A is changed. The shifting device 12 can be configured to be an internal type such as an internal transmission hub.

The human-powered vehicle A further includes the pair of operating devices G. The brake devices E are driven in accordance with a first operation S1 (refer to FIG. 2) performed on the operating devices G to brake the rotary bodies F of the human-powered vehicle A. The operating devices G are arranged at the right side of the handlebar A5 and the left side of the handlebar A5 with respect to a center plane of the human-powered vehicle A. The operating devices G each include a lever G1 operated by the user. One of the brake devices E is driven in accordance with operation (first operation S1) of the lever G1 of one of the operating devices G. The other of the brake devices E is driven in accordance with operation (first operation S1) of the lever G1 of the other of the operating devices G. Alternatively, the brake devices E (in the present embodiment, two brake devices E) can be operated in accordance with operation of each of the pair of operating devices G. In this case, the ratio of braking force of each brake device E corresponding to one of the operating devices G can differ from the ratio of braking force of each brake device E corresponding to the other of the operating devices G.

Figure 2:
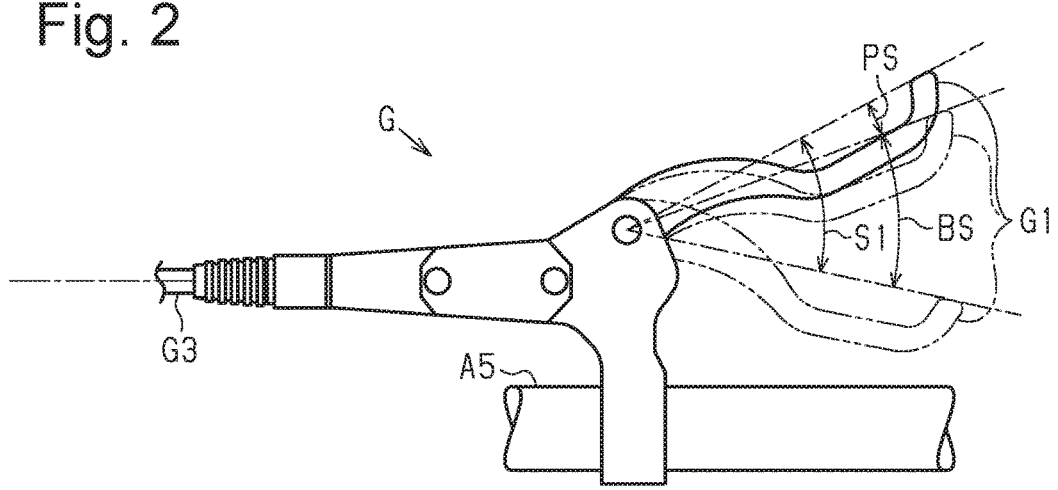
FIG. 2 is a plan view showing one example of a play operating amount included in the operating device shown in FIG. 1.

FIG. 2 shows the operating device G arranged on the right side of the handlebar A5. The operating device G is connected to the electric driving portion E2 via an electrical cable G3. The operating device G is configured to have a play operating amount PS before the rotary body F starts to be braked in the first operation S1. In the present embodiment, the brake device E will not be driven until an operating amount of the lever G1 of the operating device G exceeds the play operating amount PS. If the operating amount of the lever G1 of the operating device G exceeds the play operating amount PS and reaches a brake operating amount BS, the brake device E is driven and the rotary body F of the human-powered vehicle A is braked by the brake device E. The lever G1 indicated by the solid line in FIG. 2 shows the position of the lever G1 in an initial state in which the lever G1 is not operated. The levers G1 indicated by the double-dashed lines in FIG. 2 show the position of the lever G1 in a state having the maximum play operating amount PS and the position of the lever G1 in a state having the maximum brake operating amount BS. The operating device G can be configured not to have the play operating amount PS.

Figure 3:
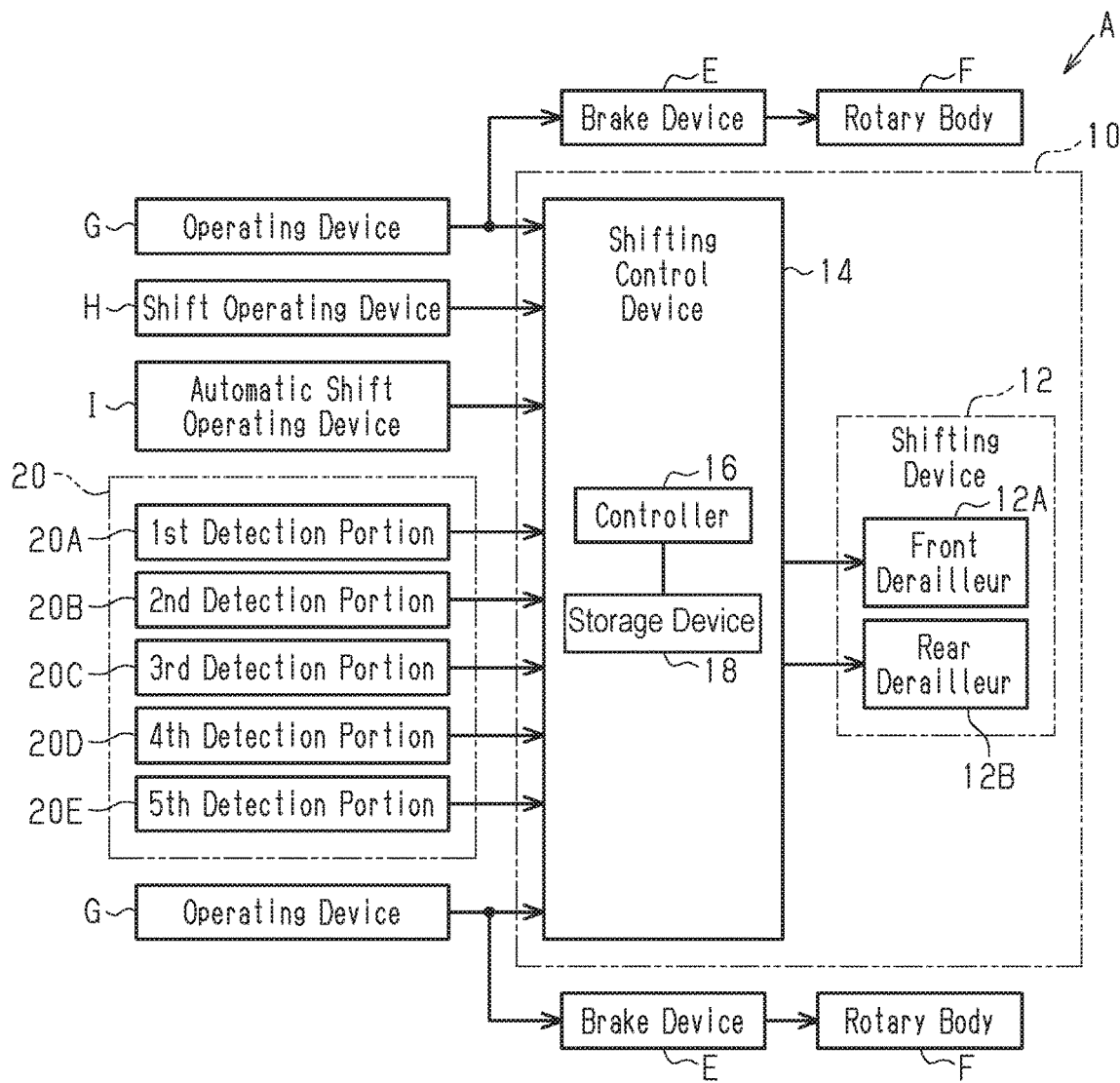
FIG. 3 is a block diagram showing the relationship between the electric shifting system shown in FIG. 1 and various components.

As shown in FIG. 3, the electric shifting system 10 further includes a shifting control device 14 of the present disclosure. The shifting control device 14 controls the shifting device 12 in accordance with the first operation S1 performed on the operating devices G to brake the rotary bodies F of the human-powered vehicle A. The first operation S1 includes, for example, at least one of an operation performed on the operating devices G in the play operating amount PS and an operation performed on the operating devices G in the brake operating amount BS. In a first example, the shifting control device 14 controls the shifting device 12 so that the shifting device 12 is actuated in the play operating amount PS. In a second example, the shifting control device 14 controls the shifting device 12 so that the shifting device 12 is actuated in the brake operating amount BS. In this example, the first operation S1 performed on the operating devices G is detected based on at least one of movement of the levers G1 of the operating devices G, movement of the brake device E corresponding to movement of the operating devices G, and movement of the power transmission medium G2 corresponding to movement of the operating devices G. In a third example, the shifting control device 14 controls the shifting device 12 so that the shifting device 12 is actuated in each of the play operating amount PS and the brake operating amount BS. The shifting control device 14 can be arranged on the shifting device 12 (here, one of front derailleur 12A and rear derailleur 12B) or can be arranged on the operating devices G. Further, the shifting control device 14 can be arranged on a position of the human-powered vehicle A different from the shifting device 12 and the operating devices G such as the frame A1 or the front fork A2.

The shifting control device 14 includes a controller 16 controlling the shifting device 12 and a storage device 18 storing information related to control of the shifting device 12. The controller 16 includes a processor such as a central processing unit (CPU) or a micro processing unit (MPU). The controller 16 can include one or multiple microcomputers. The storage device 18 includes nonvolatile memory and volatile memory. The storage device 18 stores, for example, various programs for control and preset information. Information stored in advance in the storage device 18 can be configured to be changeable with a designated input device (not shown). The processor of the controller 16 deploys and runs various programs in the storage device 18 to execute various controls of the electric shifting system 10.

The controller 16 controls the shifting device 12 to change the transmission ratio of the human-powered vehicle A in accordance with the first operation S1. In the present embodiment, the controller 16 controls the shifting device 12 to decrease the transmission ratio in accordance with the first operation S1. The controller 16 controls, for example, the front derailleur 12A and the rear derailleur 12B in combination to decrease the transmission ratio in a stepped manner. The controller 16 can continuously control the shifting device 12 during the first operation S1 performed on the operating devices G or can control the shifting device 12 once or multiple times in accordance with the first operation S1 performed on the operating devices G. In a case where the shifting device 12 is controlled multiple times in accordance with the first operation S1 performed on the operating devices G, the controller 16 can control the shifting device 12 to decrease the transmission ratio and then increase the transmission ratio in a range smaller than the transmission ratio that is used before the first operation S1. The controller 16 can control the shifting device 12 in accordance with the first operations S1 of the left and right operating devices G or can control the shifting device 12 in accordance with the first operation S1 of only one of the left and right operating devices G.

The controller 16 controls the shifting device 12 so that an actuation aspect of the shifting device 12 differs in accordance with operation information related to the operation state of the operating devices G. The operation information includes at least one of information related to a rotational angle of the lever G1, information related to rotation speed of the lever G1, and information related to operating force applied to the lever G1. The controller 16 controls the shifting device 12, for example, to further decrease the transmission ratio in accordance with the level of the rotational angle of the lever G1, the level of the rotation speed of the lever G1, or the level of the operating force applied to the lever G1.

The controller 16 controls the shifting device 12 so that the actuation aspect of the shifting device 12 differs in accordance with travel information related to a travel state of the human-powered vehicle A other than the first operation S1. The controller 16 is triggered, for example, by the first operation S1 of the operating devices G to control the shifting device 12 so that the actuation aspect of the shifting device 12 differs in accordance with at least one of the operation information and the travel information. In the present embodiment, information showing the relationship between the operation information and travel information and the actuation aspect of the shifting device 12 is stored in the storage device 18.

The travel information includes at least one of first travel information, second travel information, third travel information, fourth travel information, and fifth travel information. The first travel information includes information related to speed of the human-powered vehicle A. In an example in which the first travel information is included in the travel information, the controller 16 controls the shifting device 12 to decrease the transmission ratio as the speed of the human-powered vehicle A is reduced. The second travel information includes information related to acceleration of the human-powered vehicle A. In an example in which the second travel information is included in the travel information, the controller 16 controls the shifting device 12 to decrease the transmission ratio as the acceleration of the human-powered vehicle A is decreased. The third travel information includes information related to an inclination of the human-powered vehicle A. The third travel information includes information related to an inclination of the human-powered vehicle A in the front-rear direction. The inclination of the human-powered vehicle A in the front-rear direction correlates with the gradient of the road surface. In an example in which the third travel information is included in the travel information, the controller 16 controls the shifting device 12 to decrease the transmission ratio as a rising gradient is increased. The fourth travel information includes information related to force applied to the rotary body F by braking. In an example in which the fourth travel information is included in the travel information, the controller 16 controls the shifting device 12 to decrease the transmission ratio as the braking force applied to the rotary bodies F increases. The fifth travel information includes information related to operation of the drive mechanism B of the human-powered vehicle A. The fifth travel information includes information related to rotation speed of the crank C. In an example in which the fifth travel information is included in the travel information, the controller 16 controls the shifting device 12 so that the difference between the rotation speed of the crank C before the first operation S1 and the rotation speed of the crank C after the first operation S1 is included a predetermined range. Preferably, the predetermined range is relatively narrow. The fifth travel information can include information related to whether or not the chain D3 is driven. The travel information can further include sixth travel information related to an altitude of the current position of the human-powered vehicle A. The altitude shows the difference in height between a mean sea level and the current position of the human-powered vehicle A.

The human-powered vehicle A further includes a detection device 20 detecting an operation state of the operating devices G and a travel state of the human-powered vehicle A. The detection device 20 includes at least one of a first detection portion 20A, a second detection portion 20B, a third detection portion 20C, a fourth detection portion 20D, and a fifth detection portion 20E. The detection device 20 sends, for example, various detected information to the shifting control device 14.

The first detection portion 20A detects the operation state of the operating devices G. The first detection portion 20A includes, for example, at least one of a sensor (not shown) detecting a rotational angle of the lever G1 with respect to the initial state in which the lever G1 is not operated, a sensor (not shown) detecting rotation speed of the lever G1, and a sensor (not shown) detecting operating force applied to the lever G1. In the present embodiment, the first detection portion 20A is provided for each operating device G. FIG. 3 shows only one of the first detection portions 20A. The first operation S1 performed on the operating device G is detected, for example, by the first detection portion 20A.

The second detection portion 20B detects at least one of speed of the human-powered vehicle A and acceleration of the human-powered vehicle A. The second detection portion 20B includes, for example, a magnetic sensor (not shown) detecting a magnet MS (refer to FIG. 1) arranged on a spoke A8 (refer to FIG. 1) of the front wheel A3. In the present embodiment, the second detection portion 20B is arranged on the front fork A2. The second detection portion 20B detects the magnet MS. Thus, the rotation speed of the front wheel A3 is detected, and the speed of the human-powered vehicle A and the acceleration of the human-powered vehicle A are detected.

The third detection portion 20C detects an inclination of the human-powered vehicle A in the front-rear direction. The third detection portion 20C includes, for example, an inclination sensor (not shown) detecting an inclination of the human-powered vehicle A with respect to a horizontal plane. In the present embodiment, the third detection portion 20C is arranged on the frame A1. The inclination sensor is realized, for example, by an acceleration sensor.

The fourth detection portion 20D detects force applied to the rotary body F. The fourth detection portion 20D includes, for example, a pressure sensor (not shown) detecting force of brake pads (not shown) included in the brake device E contacting the rotary body F. In the present embodiment, the fourth detection portion 20D is provided for each brake device E. FIG. 3 shows only one of the fourth detection portions 20D. The fourth detection portion 20D can be provided for only one of the brake devices E.

The fifth detection portion 20E detects the rotation speed of the crank C. The fifth detection portion 20E includes, for example, a magnetic sensor (not shown) detecting a magnet (not shown) arranged on the frame A1. In the present embodiment, the fifth detection portion 20E is arranged on one of the crank arms C2. The fifth detection portion 20E detects the magnet. Thus, the rotation speed of the crank C is detected.

The controller 16 obtains at least one of the operation information and the travel information from the detection device 20 and obtains information (hereinafter, "shifting information") related to the actuation aspect of the shifting device 12 corresponding to the obtained information from the storage device 18. The detection portions 20B to 20E detecting elements that are not used in control of the shifting device 12 in accordance with the first operation S1 can be omitted from the detection device 20.

The controller 16 is configured to control the shifting device in a first control mode in which the shifting device 12 is controlled in accordance with the first operation S1 and a second control mode in which the shifting device 12 is controlled in accordance with a second operation different from the first operation S1. The controller 16 executes the first control mode in accordance with the first operation S1 and controls the shifting device 12 in accordance with at least one of the operation information and the travel information. The second operation includes, for example, an operation of a shift operating device H for selecting any transmission ratio of the human-powered vehicle A. The shift operating device H is arranged on the handlebar A5 of the human-powered vehicle A (refer to FIG. 1). The controller 16 executes the second control mode in accordance with the second operation and controls the shifting device 12 to obtain the transmission ratio corresponding to the second operation performed on the shift operating device H.

The controller 16 is further configured to control the shifting device in a third control mode in which the shifting device 12 is programmatically or automatically controlled in accordance with the travel information related to the travel state of the human-powered vehicle A. The third control mode is set, for example, by a third operation performed on an automatic shift operating device I for automatically changing the transmission ratio of the human-powered vehicle A. The automatic shift operating device I is arranged, for example, on the handlebar A5 of the human-powered vehicle A. The controller 16 executes the third control mode in accordance with the third operation and automatically controls the shifting device 12 in accordance with various travel information obtained from the detection device 20. For example, the second control mode and the third control mode are alternatively selected. More specifically, the controller 16 changes the control mode to the third control mode in accordance with the third operation performed on the automatic shift operating device I and changes the control mode to the second control mode in accordance with the second operation performed on the shift operating device H and actuates the shifting device 12. Additionally, in any one of the second control mode and the third control mode, the controller 16 executes the first control mode in accordance with the first operation S1 performed on the operating devices G and actuates the shifting device 12.

The controller 16 controls the shifting device 12 so that the actuation aspect of the shifting device 12 in the first control mode differs from the actuation aspect of the shifting device 12 in the third control mode. In one example, the controller 16 controls the shifting device 12 in the first control mode so that the transmission ratio is smaller than the actuation aspect of the shifting device 12 in the third control mode. More specifically, a threshold value determining the actuation aspect of the shifting device 12 in the first control mode is set to be lower than a threshold value determining the actuation aspect of the shifting device 12 in the third control mode. As a result, even if the shifting device 12 is in a non-actuated state (speed, rotation speed of crank C, etc.) in the third control mode, the shifting device 12 is controlled in the first control mode to decrease the transmission ratio. With this example, a comfortable riding feel (pedaling feel) is provided to the user, and the user can lightly ride the human-powered vehicle.

Figure 4:
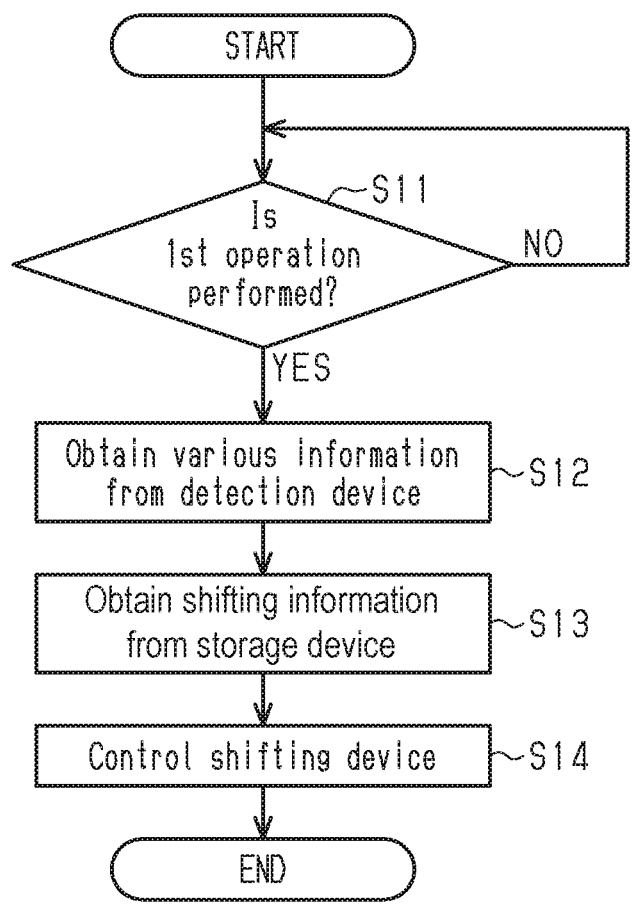
FIG. 4 is a flowchart showing one example of control executed by the shifting control device shown in FIG. 3.

One example of control executed by the controller 16 will now be described with reference to FIG. 4.

In step S11, the controller 16 determines whether or not the first operation S1 is performed on the operating devices G. If the controller 16 determines in step S11 that the first operation S1 is not performed on the operating devices G, the controller 16 repeats the process of step S11. If the controller 16 determines in step S11 that the first operation S1 is performed on the operating devices G, the controller 16 executes the first control mode in accordance with the first operation S1 performed on the operating devices G and proceeds to the process of step S12.

In step S12, the controller 16 obtains various information from the detection device 20. More specifically, the controller 16 obtains at least one of the operation information and the travel information from the detection device 20. In step S13, the controller 16 obtains, from the storage device 18, the shifting information corresponding to the information obtained from the detection device 20. More specifically, the controller 16 obtains the shifting information based on the relationship between information obtained from the detection device 20 and information stored in the storage device 18. In step S14, the controller 16 controls the shifting device 12 in accordance with the shifting information obtained from the storage device 18. The controller 16 repeats the processes of steps S11 to S14 until the second operation performed on the shift operating device H or the third operation performed on the automatic shift operating device I is detected.

Modified Examples

The description related to the above embodiment exemplifies, without any intention to limit, applicable forms of a shifting control device and an electric shifting system according to the present disclosure. The shifting control device and the electric shifting system according to the present disclosure are applicable to, for example, modified examples of the above embodiment that are described below and combinations of two or more of the modified examples that do not contradict each other. In the following modified examples, the same reference characters are given to those elements that are the same as the corresponding elements of the embodiment. Such elements will not be described in detail.

The relationship between the actuation aspect of the shifting device 12 in the first control mode and the actuation aspect of the shifting device 12 in the third control mode can be changed in any manner. In one example, the controller 16 controls the shifting device 12 so that the actuation aspect of the shifting device 12 in the first control mode is substantially the same as the actuation aspect of the shifting device 12 in the third control mode.

The configuration of the first control mode can be changed in any manner. In a first example, the controller 16 is triggered by the first operation S1 performed on the operating devices G to control the shifting device 12 so that the actuation aspect of the shifting device 12 differs in accordance with only the operation information. In this example, the detection portions 20B to 20E can be omitted from the detection device 20. In a second example, the controller 16 is triggered by the first operation S1 performed on the operating devices G to control the shifting device 12 so that the actuation aspect of the shifting device 12 differs in accordance with only the travel information. In this example, the operating devices G can be buttons (not shown) instead of the levers G1. In this case, the first detection portion 20A includes a displacement sensor (not shown) detecting a displacement amount of the buttons with respect to an initial state. In a third example, the controller 16 controls the shifting device 12 in accordance with only the first operation S1 performed on the operating devices G. In one example, the controller 16 controls the shifting device 12 in accordance with the first operation S1 performed on the operating devices G so that the transmission ratio is decreased in a preset range. In this example, the storage device 18 can be omitted from the shifting control device 14. In addition, the detection portions 20B to 20E can be omitted from the detection device 20.

The number of control modes executable by the controller 16 can be changed in any manner. In a first example, the controller 16 does not include the second control mode. In this example, the shift operating device H is omitted from the human-powered vehicle A. In a second example, the controller 16 does not include the third control mode. In this example, the automatic shift operating device I is omitted from the human-powered vehicle A. In a third example, the controller 16 does not include the second control mode and the third control mode.

The configuration of the first operation S1 can be changed in any manner. In a first example, the first operation S1 includes an operation performed on the operating devices G multiple times in the play operating amount PS. In a second example, the first operation S1 includes an operation continuously performed on the operating devices G for a predetermined time in the play operating amount PS. In a third example, the first operation S1 includes an operation performed on the operating devices G multiple times in the brake operating amount BS. In a fourth example, the first operation S1 includes an operation continuously performed on the operating devices G for a predetermined time in the brake operating amount BS.

DESCRIPTION OF REFERENCE CHARACTERS

10) electric shifting system, 12) shifting device, 14) shifting control device, 18) storage device, A) human-powered vehicle, B) drive mechanism, C) crank, F) rotary body, G) operating device, G1) lever, PS) play operating amount, S1) first operation

The invention claimed is:

1. A shifting control device comprising a controller configured to control a shifting device in accordance with a first operation performed on an operating device for braking a rotary body of a human-powered vehicle, wherein
   the operating device for braking the rotary body is driven responsive to the first operation,
   the shifting control device controls the shifting device to change a transmission ratio of the human-powered vehicle in accordance with the first operation, and
   the shifting control device controls the shifting device to decrease the transmission ratio in accordance with the first operation.

2. The shifting control device according to claim 1, wherein
   the shifting control device controls the shifting device so that an actuation aspect of the shifting device differs in accordance with operation information related to an operation state of the operating device.

3. The shifting control device according to claim 2, wherein
   the operating device includes a lever operated by a user, and
   the operation information includes at least one of information related to a rotational angle of the lever, information related to a rotation speed of the lever, and information related to operating force applied to the lever.

4. The shifting control device according to claim 1, wherein
   the shifting control device controls the shifting device so that an actuation aspect of the shifting device differs in accordance with travel information related to a travel state of the human-powered vehicle other than the first operation.

5. The shifting control device according to claim 4, wherein
   the travel information includes first travel information related to speed of the human-powered vehicle.

6. The shifting control device according to claim 4, wherein
   the travel information includes second travel information related to acceleration of the human-powered vehicle.

7. The shifting control device according to claim 4, wherein the travel information includes third travel information related to an inclination of the human-powered vehicle.

8. The shifting control device according to claim 7, wherein
the third travel information includes information related to an inclination of the human-powered vehicle in a front-rear direction.

9. The shifting control device according to claim 4, wherein
the travel information includes fourth travel information related to force applied to the rotary body by braking.

10. The shifting control device according to claim 4, wherein
the travel information includes fifth travel information related to operation of a drive mechanism of the human-powered vehicle.

11. The shifting control device according to claim 10, wherein
the drive mechanism includes a crank,
the fifth travel information includes information related to rotation speed of the crank, and
the shifting control device controls the shifting device so that a difference between the rotation speed of the crank before the first operation and the rotation speed of the crank after the first operation is included in a predetermined range.

12. The shifting control device according to claim 1, further comprising:
a storage device configured to store information related to control of the shifting device.

13. An electric shifting system comprising:
the shifting control device according to claim 1; and
the shifting device, configured to be electrically driven.

14. A shifting control device comprising a controller configured to control a shifting device in accordance with a first operation performed on an operating device for braking a rotary body of a human-powered vehicle, wherein
the operating device is configured to have a play operating amount before the rotary body starts to be braked in the first operation, and
the shifting control device controls the shifting device so that the shifting device is actuated in the play operating amount.

15. A shifting control device comprising a controller configured to control a shifting device in accordance with a first operation performed on an operating device for braking a rotary body of a human-powered vehicle, wherein the controller is further configured to control the shifting device in:
a first control mode in which the shifting device is controlled in accordance with the first operation; and
a second control mode in which the shifting device is controlled in accordance with a second operation different from the first operation.

16. The shifting control device according to claim 15, wherein the controller is further configured to control the shifting device in:
a third control mode in which the shifting device is programmatically controlled in accordance with travel information related to a travel state of the human-powered vehicle.

17. The shifting control device according to claim 16, wherein
the shifting control device controls the shifting device so that an actuation aspect of the shifting device in the first control mode differs from an actuation aspect of the shifting device in the third control mode.

* * * * *